United States Patent
Jeddeloh (10) Patent No.: US 6,934,813 B1
(45) Date of Patent: *Aug. 23, 2005

(54) SYSTEM AND METHOD FOR CACHING DATA BASED ON IDENTITY OF REQUESTOR

(75) Inventor: Joseph Jeddeloh, Minneapolis, MN (US)

(73) Assignee: Micron Technology, Inc., Boise, ID (US)

( * ) Notice: Subject to any disclaimer, the term of this patent is extended or adjusted under 35 U.S.C. 154(b) by 28 days.

This patent is subject to a terminal disclaimer.

(21) Appl. No.: 10/651,021

(22) Filed: Aug. 27, 2003

Related U.S. Application Data (63) Continuation of application No. 09/805,663, filed on Mar. 13, 2001, now Pat. No. 6,636,946.

(51) Int. Cl.[7] .............................................. G06F 12/00
(52) U.S. Cl. ...................... 711/138; 711/118; 711/119; 711/122; 711/141; 709/104; 709/105
(58) Field of Search ................................ 711/138, 118, 711/119, 122, 141; 709/104, 105

(56) References Cited

U.S. PATENT DOCUMENTS

| | | | |
|---|---|---|---|
| 5,263,142 A | 11/1993 | Watkins et al. ............. | 395/425 |
| 5,432,912 A | 7/1995 | Kihara ........................ | 395/275 |
| 5,740,380 A | 4/1998 | LaBerge et al. ............ | 395/287 |
| 5,805,835 A | 9/1998 | Jeddeloh et al. ............ | 395/287 |
| 5,860,109 A | 1/1999 | Hagersten et al. .......... | 711/141 |
| 5,878,235 A | 3/1999 | Porterfield et al. ......... | 395/292 |
| 5,935,233 A | 8/1999 | Jeddeloh ..................... | 710/129 |
| 5,978,872 A | 11/1999 | Porterfield et al. ......... | 710/100 |
| 5,991,843 A | 11/1999 | Porterfield et al. ......... | 710/112 |
| 5,991,855 A | 11/1999 | Jeddeloh et al. ............ | 711/146 |
| 6,018,792 A | 1/2000 | Jeddeloh et al. ............ | 711/146 |
| 6,046,952 A | 4/2000 | Novak et al. ................ | 365/222 |
| 6,049,855 A | 4/2000 | Jeddeloh ..................... | 711/157 |
| 6,145,040 A | 11/2000 | LaBerge et al. ............ | 710/107 |
| 6,157,398 A | 12/2000 | Jeddeloh ..................... | 345/521 |
| 6,199,138 B1 | 3/2001 | Jeddeloh ..................... | 711/105 |
| 6,202,133 B1 | 3/2001 | Jeddeloh ..................... | 711/157 |
| 6,212,598 B1 | 4/2001 | Jeddeloh ..................... | 711/105 |
| 6,252,612 B1 | 6/2001 | Jeddeloh ..................... | 345/521 |
| 6,272,609 B1 | 8/2001 | Jeddeloh ..................... | 711/169 |
| 6,275,913 B1 | 8/2001 | Jeddeloh ..................... | 711/158 |
| 6,275,914 B1 | 8/2001 | Jeddeloh ..................... | 711/158 |
| 6,295,592 B1 | 9/2001 | Jeddeloh ..................... | 711/169 |
| 6,314,500 B1 | 11/2001 | Rose ........................... | 711/148 |
| 6,338,125 B1 | 1/2002 | Kopser et al. ............... | 711/150 |
| 6,351,767 B1 | 2/2002 | Batchelder et al. ......... | 709/219 |
| 6,463,510 B1 | 10/2002 | Jones et al. ................. | 711/138 |
| 6,470,429 B1 | 10/2002 | Jones et al. ................. | 711/138 |
| 6,480,951 B2 | 11/2002 | Porterfield .................. | 711/206 |

*Primary Examiner*—Donald Sparks
*Assistant Examiner*—Ngoc V Dinh
(74) *Attorney, Agent, or Firm*—Fish & Neave IP Group of Ropes & Gray LLP; Jeffrey H. Ingerman (57) ABSTRACT

In a computer or microprocessor system having a plurality of resources making memory requests, a caching system includes a source tag generator which, depending on the embodiment, could reside in the requesting system resource, in a bus arbiter, or in a combination of a bus arbiter and a switch arbiter, or elsewhere. The system also includes cache control circuitry capable of using the source tag to make cacheability decisions. The cache control circuitry, and therefore the cacheability decisions, could be fixed—e.g., by a user—or could be alterable based on a suitable algorithm—similar, e.g., to a least-recently-used algorithm—that monitors cache usage and memory requests. The caching system is particularly useful where the cache being controlled is large enough to cache the results of I/O and similar requests and the requesting resources are I/O or similar resources outside the core logic chipset of the computer system.

14 Claims, 5 Drawing Sheets

SYSTEM AND METHOD FOR CACHING DATA BASED ON IDENTITY OF REQUESTOR

CROSS REFERENCE TO RELATED APPLICATION

This is a continuation of, commonly-assigned U.S. patent application Ser. No. 09/805,663, filed Mar. 13, 2001, now U.S. Pat. No. 6,636,946.

BACKGROUND OF THE INVENTION

This invention relates to the processing of memory requests in a computer system. More particularly, this invention relates to the caching of data based on the identity of the system resource making the memory request.

It is known to provide cache in computer systems to minimize the effects of memory latency. If the results of memory requests that are made frequently are stored in a cache memory adjacent to a central processing unit (CPU), the time necessary for any of those memory requests to be fulfilled is reduced. Thus, for example, in the case of a microprocessor used as the CPU in a personal computer, cache memory may advantageously be provided on-board the microprocessor chip, or in the core logic chipset that includes the microprocessor.

As memory has become less expensive and more available, additional and larger caches have become possible. Thus, in addition to the cache described above, which has come to be known as level-one, or L1, cache, it is known to provide level-two, or L2, cache at a somewhat greater distance from the CPU than the L1 cache; typically, L2 cache is also larger than the L1 cache. Because L2 cache is farther from the CPU than L1 cache, it may take longer for the CPU to access the L2 cache than the L1 cache. Moreover, because L2 cache is not expected to be as fast as L1 cache, the memory devices used for L2 cache may be slower than those used for L1 cache. As a result, L2 cache is used for the results of requests that are made less often, or whose arrival at the CPU is not as time critical.

It has now become known as well to provide a level-three, or L3, cache at an even greater distance from the CPU, either within the core logic chipset or elsewhere in the system (e.g., in the case of personal computer, on the motherboard).

L1 and, to some extent, L2, caches have been used primarily to cache memory requests made by the CPU itself. This has been because, first, it is axiomatic that CPU operation is central to all other system operations; if the CPU is slowed down, it cannot perform operations and direct other parts of the system. Second, cache size has heretofore been limited, and the results of CPU memory requests are typically small enough to fit within previously available caches.

When only CPU memory requests were cached, it normally was not necessary to determine whether or not a particular request should be cached. The results of all requests were typically cached, and logic, such as a least-recently-used routine, was used to determine, when the cache was full, which cached item should be deleted to make room for the next item to be cached.

With the advent of larger caches, such as those available as L3 cache, the caching of results of memory requests made by other system components such as input/output (I/O) components, which results tend to be larger than those of requests made by the CPU, becomes possible. However, if one is going to cache the results of memory requests by various system components, which are of less importance than the CPU, and which vary among themselves in level of importance, it becomes necessary to distinguish between requests whose results are to be cached and requests whose results are not to be cached.

SUMMARY OF THE INVENTION

In accordance with the present invention, caching decisions are facilitated by associating with each memory request an identification, or tag, of the system component that is the source of the memory request. The source tag can be used by the cache control logic to determine whether or not the results of a particular request should be cached. The cache control logic may be programmed to always, or never, cache the results of memory requests by particular components.

While the cache control logic could be fixed, an algorithm, similar to the least-recently-used routine referred to above, can be used to rewrite the cache control logic on the fly based on system conditions and changing memory usage patterns.

Thus, in accordance with the invention, a method is provided for caching data retrieved from memory in response to a request by a system resource in a computer system. Under the method, when a memory request is received from the system resource, a source tag, identifying the system resource, is appended to the memory request. The memory request is processed to determine, based on the source tag, whether the result of the memory request is to be cached.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

As described above, the present invention allows "intelligent" choices to be made by cache control circuitry or software in deciding whether or not to cache the results of a memory request in a system where requests by resources other than the CPU are cached. The cache used to cache such requests may be, but need not be, an L3 cache. For example, in a personal computer system where a large cache is provided on the motherboard, with the intent that it function as L3 cache, but a core logic chipset is used that does not have L2 cache, then the cache on the motherboard would be L2 cache. Nevertheless, because it is large, that L2 cache could be used to cache the results of memory requests by multiple system resources, and the invention would apply. However, because of speed considerations, it is preferable that the cache with which the invention is used be provided on-board the core logic chipset, regardless of the level of the cache, as long it is large enough that the caching of I/O and other large requests from various system resources is possible (e.g., in the 8, 16 or even 32 megabyte range).

In accordance with the invention, a source tag is applied to memory requests made by resources in the class of resources the results of whose requests are to be cached. The source tag may be a separate message associated with the memory request. Alternatively, the source tag may be inserted into a field provided for that purpose in the memory request message itself. The source tag is used by cache control logic to determine whether or not to cache the results of that particular request. The source tag may be applied in a number of ways, and the cache control logic may use the source tag in a number of ways.

First, the requesting resource may on its own apply the source tag to the request. This requires additional intelligence, or at least the storing of an identifier, in the requesting resource, sufficient for the resource to send the separate message identifying itself as the requestor, or to insert its identifier into the aforementioned field included for this purpose in the request.

Second, the source tag may be applied to the request by the routing system as the request is routed from the resource that made the request to the memory controller and the cache controller. A common topology may be that resources are located on particular buses, and more specifically on particular lines of particular buses. In such a topology, each of those buses accesses the core logic chipset through an arbiter, each resource has its own dedicated line into one of the arbiters, and all of the arbiters are connected to the CPU and the various controllers through a single switch arbiter, with each arbiter having its own dedicated line into the switch arbiter.

In one variant, no individual element knows its own identity, but based on its own inputs, it can identify the elements that communicate with it. Thus, an arbiter on a particular bus may not be able to identify itself, but may know that a request has been received from a resource on a particular conductor of that bus. The arbiter will pass the request on to the switch arbiter. The switch arbiter knows, by virtue of which of its own inputs the request was received on, which arbiter sent it the request. When the switch arbiter passes the request on to the cache controller, it adds the identity of the first arbiter. Thus, the request is now associated with a unique source tag that includes the bus conductor as determined by the first arbiter, and the first arbiter's identity as determined by the switch arbiter.

In another variant at the opposite extreme, the system resource itself has a unique identifier that it includes as a source tag directly in any request that it makes. This variant does not require anything of the arbiters or the switch arbiter. In an intermediate variant, the individual resources cannot identify themselves and must be identified by the respective arbiters, and in addition each arbiter can identify itself, and therefore the source tag is created exclusively at the arbiter level, without the need for any involvement by the switch arbiter.

After the tagged memory request has been processed and fulfilled, or while it is being processed and fulfilled, the cache controller also processes the request to determine whether or not the results, once returned, should be cached. One scheme or strategy for caching the results could be cache all results, but to overwrite or delete already cached items based on which is least recently used, as is known. This scheme, which is based solely on the content of the data themselves, rather than on the identity of the system resource making the request, is known, would not rely on the source tag, and is not part of the present invention.

A caching scheme in accordance with the present invention, utilizing the source tag, could be based on preprogrammed instructions, stored in cache configuration registers, that requests by certain system resources should always, or never, be cached. According to such a scheme, if something must be deleted from the cache to make room for data that must be cached, the selection of which data to delete may be based on age, or on which data are least recently used.

In a variant of this caching scheme, instead of deleting items from the cache based on which item is least recently used, the cache controller could keep track of the "hit rate" for each item in the cache. If something must be deleted to make room for a new item to be cached, the item that has been accessed least frequently (rather than least recently) is deleted.

An alternative caching scheme in accordance with the present invention, utilizing the source tag, could be based on logic programmed into the cache controller. Such logic could be similar to a least-recently-used algorithm. As one example of such logic, instead of keeping track of which cached data were least recently used, the cache controller could keep track of which system resource has least recently made a memory request, giving requests made by that resource lowest priority for caching—i.e., once the cache is full, which happens soon after the system is started, not caching requests made by that resource.

In either of the aforementioned caching schemes, or in any caching scheme in accordance with the invention, each memory request may include a read/write identification. If so, then in accordance with the invention, only the results of requests with "read" identifications would be cached.

The invention will now be described with reference to FIGS. 1–6.

Figures 1, 4:
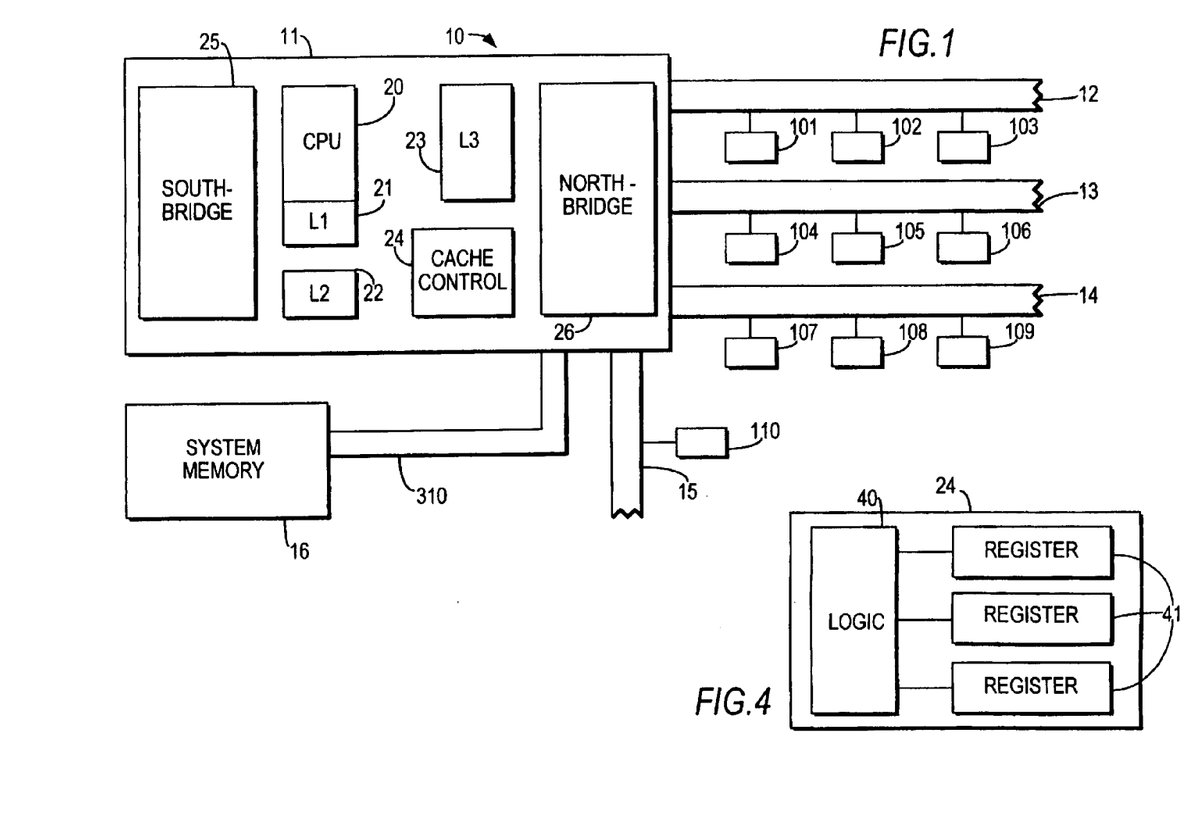
FIG. 1 is a schematic representation of a personal computer architecture.
FIG. 4 is a schematic representation of the cache control circuitry of the core logic chipset of FIG. 2.

A computer system 10 with which the present invention may be used is preferably a personal computer, server or workstation including a core logic chipset 11. As is well-known, system 10 may include several PCI (Peripheral Component Interconnect) buses 12, 13, 14, connecting chipset 11 to peripheral devices 101–109, which may include storage and I/O devices. System 10 may also include an AGP (Accelerated Graphics Port) bus 15 serving peripheral device 110.

Figure 2:
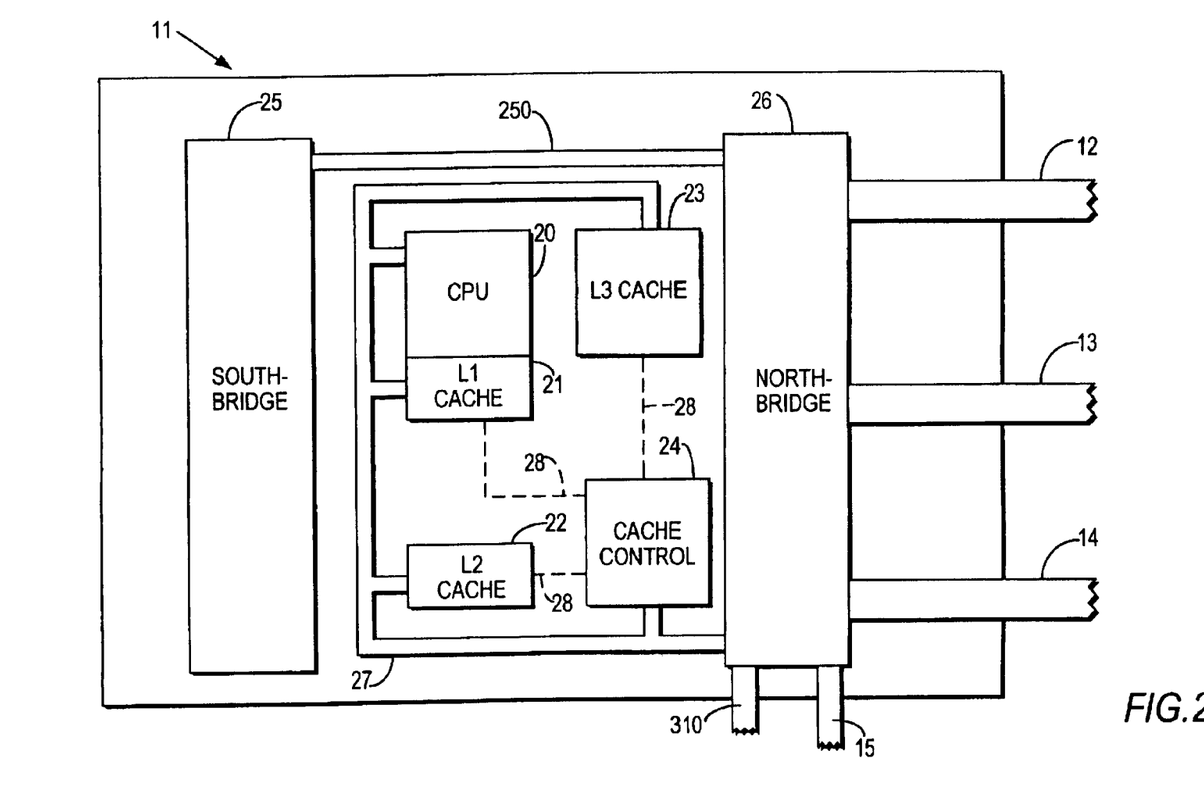
FIG. 2 is a schematic representation of the core logic chipset of the personal computer of FIG. 1.
Figure 3:
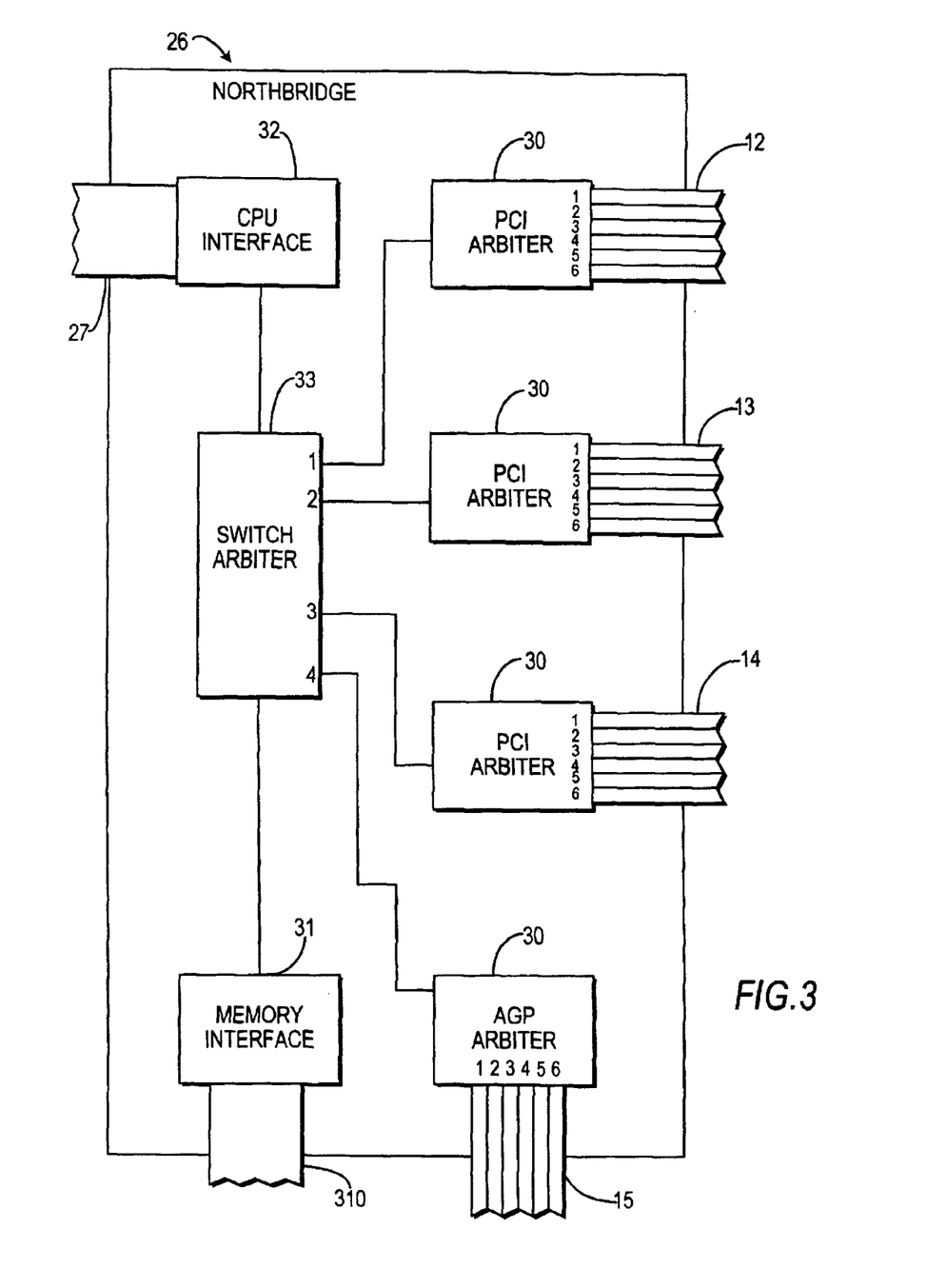
FIG. 3 is a schematic representation of the northbridge chip of the core logic chipset of FIG. 2.

Core logic chipset 11 includes various components interconnected by a suitable host bus 27, including CPU 20 with associated L1 cache 21, additional L2 cache 22, L3 cache 23, and cache control circuitry 24. Cache control circuitry 24 may have separate direct communications 28 with the various caches. Chipset 11 also includes a northbridge chip 26, which connects CPU 20 to system memory and the PCI and AGP buses 12–15. Northbridge chip 26 is therefore the preferred location of the source tag generation according to the invention. Within northbridge chip 26 are preferably a plurality of bus arbiters 30, one for each of PCI and AGP buses 12–15. Northbridge chip 26 preferably also includes an interface 31 to system memory 16 via memory bus 310 and an interface 32 to CPU 20. A switch arbiter 33 connects the various bus arbiters 30 and interfaces 31, 32 to each other.

Chipset 11 further includes a southbridge chip 25, connected to northbridge chip 26 by internal PCI bus 250.

Southbridge chip 25 typically controls an IDE (Integrated Drive Electronics) bus, a Universal Serial Bus (USB), plug-and-play support for peripheral devices, a keyboard/mouse controller, power management, and a bridge between PCI and ISA (Industry Standard Architecture) devices. The southbridge may also provide audio functions.

In one embodiment of the invention, each of peripheral devices 101–110 has a unique identification code. In this embodiment, when one of peripheral devices 101–110 makes a memory request, it includes that unique identification code in the request—e.g., as a distinct field within the same message as the request. The request is passed along one of buses 12–15, through one of bus arbiters 30 and then through switch arbiter 33 to memory interface 31 for retrieval of the data, and to CPU interface 32 for caching and for any operations called for.

Cache control circuit 24 reads the source tag, which includes the identification of the requesting system resource. Cache control circuit 24 preferably includes logic 40 and a number of cache control registers 41 which store the identifications of the resources whose requests should (or should not) be cached. As discussed above, those identifications could be stored in registers 40 by user design, using one of I/O devices 101–109 which could be, e.g., a keyboard. Alternatively, registers 40 could be rewritable by system 10 based on system conditions and changing memory usage patterns, as might be determined, for example, by a least-recently-used algorithm or similar algorithm. Thus, a page-based LRU-type algorithm could decide that a particular memory page or pages are being requested repeatedly by a single requestor whose requests are not being cached, and that therefore requests from that requestor should be cached. Registers 40 could be updated to include the identification tag of that requestor.

In another embodiment of the invention, each system resource that is a potential requester is known by which bus it is located on, and which conductor on that bus serves it. In a first variant of this second embodiment, neither the requesting resource 101–110, nor the bus arbiter 30 serving the bus 12–15 on which it is located, has any intelligence with respect to its own identity, but bus arbiter 30 is capable of passing on the number of the conductor in its own bus that serves the requesting resource. Therefore, if resource 102 makes a memory request, that request travels along conductor 6 of bus 12 to bus arbiter 30 serving bus 12. Bus arbiter 30 is capable of "telling" switch arbiter 33 that the request originated on conductor 6 of the bus that it serves. Switch arbiter 33 knows which bus arbiter 30 passed the request to it because, as discussed above, preferably each bus arbiter 30 has its own dedicated line into the switch arbiter 33. Switch arbiter 33 needs no intelligence with respect to its own identity, because preferably the identity of the bus—which switch arbiter 33 knows because it knows which bus arbiter 30 passed the request, and the conductor on the bus—which bus arbiter 30 knows and passes along, are sufficient to form the source tag. Switch arbiter 33 preferably concatenates the source tag to the request message as a separate field or includes it in an associated message, and passes the message(s) to memory interface 31 and CPU interface 32, and caching decisions are made as above.

Figure 5:
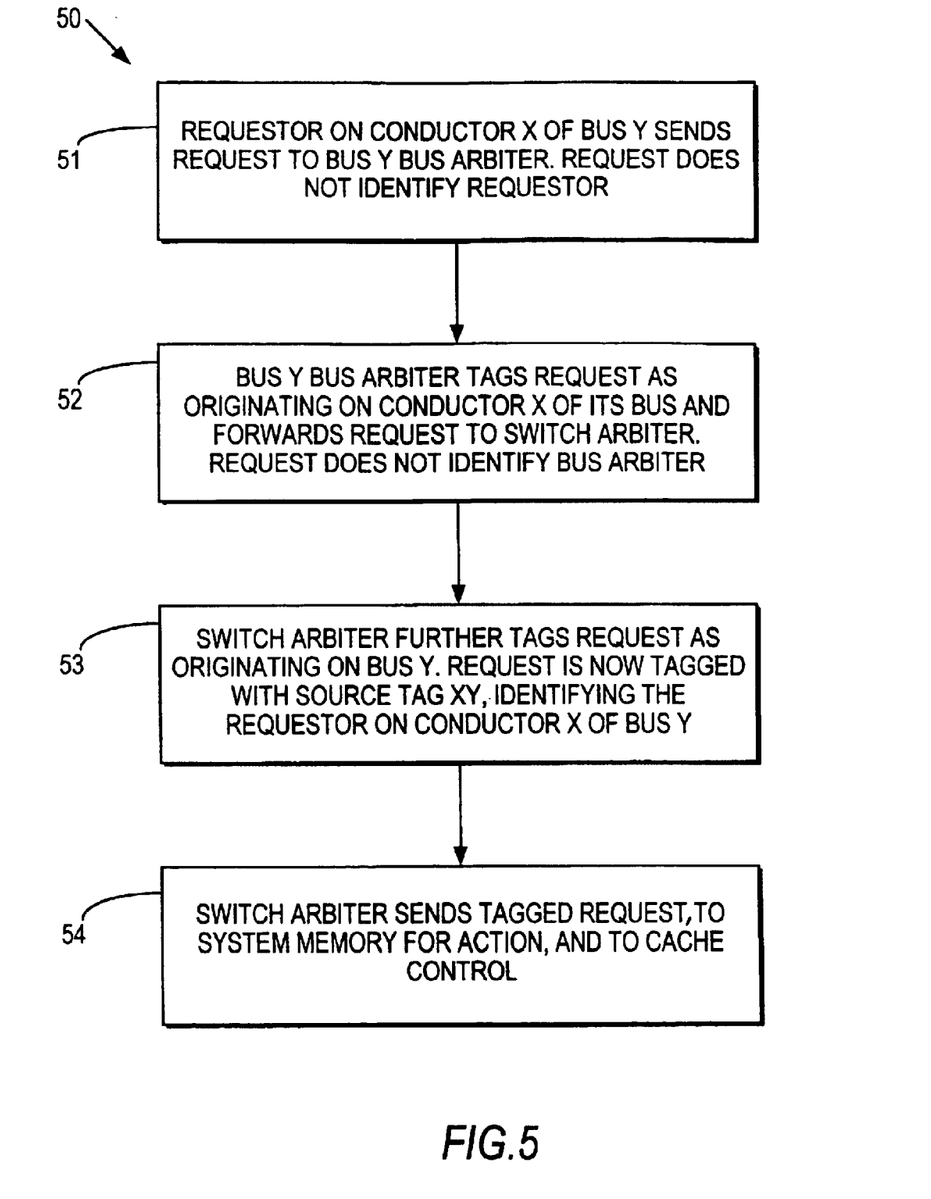
FIG. 5 is a flow chart of a preferred embodiment of the source tag creation process according to the invention.

This source tag generation portion of this variant 50 is diagramed in the flowchart of FIG. 5. At step 51, a requestor located on conductor X of bus Y sends a memory request to the bus arbiter for bus Y. At step 52, the bus arbiter sends the request on to the switch arbiter along with a tag signifying that the request was received on conductor X of the bus arbiter's bus, which the bus arbiter determines because it "knows" which of its own inputs received the request and which bus conductor is on that input. The message from the bus arbiter to the switch arbiter does not identify the bus arbiter. At step 54, the switch arbiter sends the request on to the system memory for retrieval of the data requested, and to the cache control logic. At step 53, before sending the request to the cache control logic, the switch arbiter adds to the tag identifying conductor X the further identification of bus Y, which the switch arbiter determines because it "knows" which of its own inputs received the request and which bus arbiter is on that input (each bus arbiter, as discussed above, having a dedicated input to the switch arbiter). This concatenation of the X and Y identifiers produces the source tag according to the invention, which for purposes of this discussion can be written "XY," signifying the resource on the Xth conductor of the Yth bus.

Figure 6:
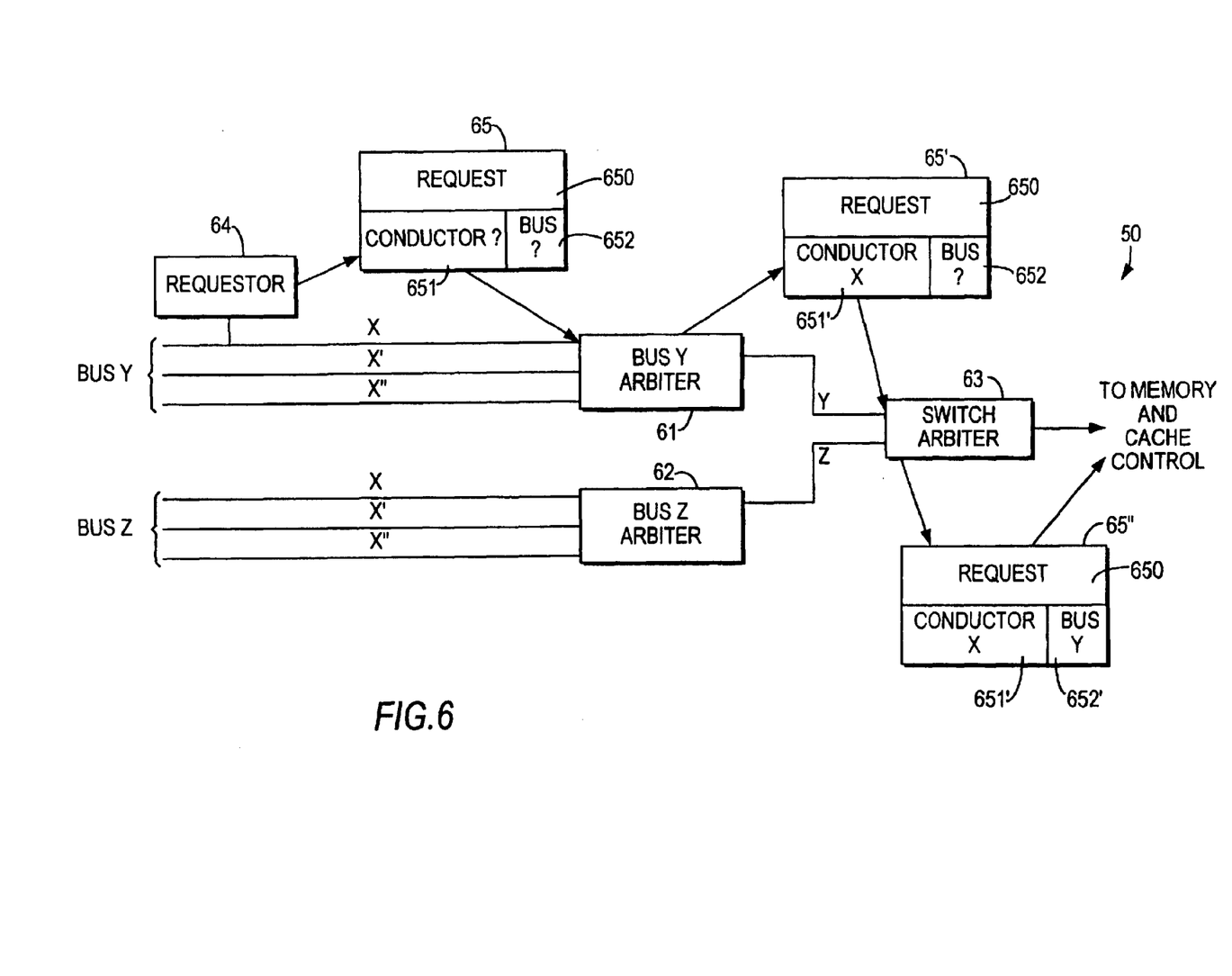
FIG. 6 is a diagrammatic illustration of the process of FIG. 5.

Process 50 is shown diagrammatically in FIG. 6. A system is shown having two buses, Y and Z, each of which has three conductors X, X' an X". Bus Y is controlled by bus arbiter 61 and bus Z is controlled by bus arbiter 62. Both bus arbiters 61, 62 are connected to switch arbiter 63. A requestor 64, which is one of resources 101–110, is connected to conductor X of bus Y, makes or sends a memory request on to conductor X. The form of the request, as made, before it reaches bus Y arbiter 61, is indicated at 65, and includes a field or fields 650 for the request itself, as well a field 651 to identify the conductor and a field 652 to identify the bus. Both of fields 651 and 652 are empty or indeterminate at this point.

The request is passed from bus Y arbiter 61 to switch arbiter 63 in the form shown at 65' where, as can be seen, data has been entered field 651 (indicated as 651' to show that it now contains data) identifying conductor X, because bus Y arbiter 61 could "see" which conductor request 65 arrived on. However, field 652 remains empty, so conductor X is not uniquely identified. The request is passed from switch arbiter 63 to memory and to cache control (neither shown in PIG. 6) in the form shown at 65" where, as can be seen, data has now also been entered in field 652 (indicated as 652' to show that it now contains data) identifying bus Y, because switch arbiter 63 could "see" which conductor request 65' arrived on. The two fields 651', 652', or more correctly the combination of the data in those fields, added to the request as it travels through the hierarchy of system 10, make up the source tag according to the invention.

In a second variant of the second embodiment, bus arbiter 30 has intelligence with respect to its own identity. As in the first variant, it identifies the requesting resource by the conductor that serves it and uses that information along with its own identity (which corresponds to the bus identity) to construct the source tag, which it then either concatenates as a new field to the request message which it passes to switch arbiter 33, or sends as an associated message to switch arbiter 33. Switch arbiter 33 passes on the message(s), and caching decisions are made as above.

As seen in the described embodiments, a system according to the invention includes a source tag generator which, depending on the embodiment, could reside in the requesting system resource, in a bus arbiter, or in a combination of a bus arbiter and a switch arbiter. The system also includes cache control circuitry capable of using the source tag to make cacheability decisions. The cache control circuitry, and therefore the cacheability decisions, could be fixed—e.g., by a user—or could be alterable based on a suitable algorithm—e.g., a least-recently-used algorithm—that monitors cache usage and memory requests.

One skilled in the art will appreciate that the present invention can be practiced by other than the described embodiments, which are presented for purposes of illustration and not of limitation, and the present invention is limited only by the claims which follow.

What is claimed is:

1. A method for caching data retrieved from working memory of a computer system in response to a request by a system resource in said computer system, said method comprising:

receiving a memory request from said system resource;

appending a source tag, identifying said system resource, to said memory request; and processing said memory request to determine, based on said source tag, whether the result of said memory request is to be cached.

2. The method of claim 1 wherein:

each said system resource has a unique identifier; and said appending comprises said system resource attaching said unique identifier to said memory request.

3. A computer system comprising:

working memory;

a plurality of system resources submitting memory requests to said working memory;

source tag circuitry for adding to each said memory request a source tag that identifies which of said system resources has made said memory request; and cache control circuitry for determining, based on said source tag, whether the result of a particular memory request is to be cached.

4. The computer system of claim 3 wherein:

each said system resource has a unique identifier; and said source tag circuitry appends said unique identifier of said system resource to each said memory request initiated by said system resource.

5. A logic chipset for use in a computer system, said computer system having at least one system resource on at least one bus, and having working memory of which said at least one system resource makes requests, said chipset comprising:

a microprocessor chip; and an interface chip for communicating between said microprocessor chip and said at least one bus;

source tag circuitry on said interface chip for adding to each said memory request a source tag that identifies which of said system resources has made said memory request; and cache control circuitry for determining, based on said source tag, whether the result of a particular memory request is to be cached.

6. The logic chipset of claim 5 wherein:

each said system resource has a unique identifier; and said source tag circuitry appends said unique identifier of said system resource to each said memory request initiated by said system resource.

7. The logic chipset of claim 5 wherein said interface chip is a northbridge chip.

8. The logic chipset of claim 7 wherein:

each said system resource has a unique identifier; and said source tag circuitry appends said unique identifier of said system resource to each said memory request initiated by said system resource.

9. A computer system comprising:

working memory means;

a plurality of system resources submitting memory requests to said working memory means;

source tag means for adding to each said memory request a source tag that identifies which of said system resources has made said memory request; and cache control means for determining, based on said source tag, whether the result of a particular memory request is to be cached.

10. The computer system of claim 9 wherein:

each said system resource has a unique identifier; and said source tag means appends said unique identifier of said system resource to each said memory request initiated by said system resource.

11. A logic chipset for use in a computer system, said computer system having at least one system resource on at least one bus means, and having working memory means of which said at least one system resource makes requests, said chipset comprising:

microprocessor chip means; and interface chip means for communicating between said microprocessor chip means and said at least one bus means;

source tag means on said interface chip means for adding to each said memory request a source tag that identifies which of said system resources has made said memory request; and cache control means for determining, based on said source tag, whether the result of a particular memory request is to be cached.

12. The logic chipset of claim 11 wherein:

each said system resource has a unique identifier; and said source tag means appends said unique identifier of said system resource to each said memory request initiated by said system resource.

13. The logic chipset of claim 11 wherein said interface chip means is a northbridge chip.

14. The logic chipset of claim 13 wherein:

each said system resource has a unique identifier; and said source tag means appends said unique identifier of said system resource to each said memory request initiated by said system resource.

* * * * *

UNITED STATES PATENT AND TRADEMARK OFFICE
CERTIFICATE OF CORRECTION

PATENT NO.    : 6,934,813 B1
DATED         : August 23, 2005
INVENTOR(S)   : Joseph Jeddeloh It is certified that error appears in the above-identified patent and that said Letters Patent is hereby corrected as shown below:

Column 1,
Line 7, "of," should be -- of copending, --.

Column 5,
Line 36, "requester" should be -- requestor --.

Column 6,
Line 18, "an" should be -- and --;
Line 25, after "well" insert -- as --;
Line 37, "PIG." should be -- FIG. --.

Signed and Sealed this

Twentieth Day of December, 2005

JON W. DUDAS
*Director of the United States Patent and Trademark Office*